United States Patent [19]
Billoud

[11] Patent Number: 5,638,304
[45] Date of Patent: Jun. 10, 1997

[54] METHOD AND APPARATUS FOR ACTIVE DAMPING OF VIBRATION

[75] Inventor: Guy Billoud, Phoenix, Ariz.

[73] Assignee: Matra Cap Systemes, Velizy-Villacoublay, France

[21] Appl. No.: 198,053

[22] Filed: Feb. 18, 1994

[30] Foreign Application Priority Data

Feb. 18, 1993 [FR] France ................. 93 01850

[51] Int. Cl.$^6$ ........................................ G10K 11/16
[52] U.S. Cl. ............................... 364/572; 381/71
[58] Field of Search .................. 364/508, 574, 364/724; 73/668, 660; 248/550; 180/300; 187/133

[56] References Cited

U.S. PATENT DOCUMENTS

| | | | |
|---|---|---|---|
| 4,694,451 | 9/1987 | Adams et al. | 370/3.21 |
| 4,795,123 | 1/1989 | Forward et al. | 248/550 |
| 4,929,874 | 5/1990 | Mizuno et al. | 318/128 |
| 5,086,564 | 2/1992 | Schalz | 33/1 M |
| 5,157,596 | 10/1992 | Alcone | 364/148 |
| 5,187,519 | 2/1993 | Takabayashi et al. | 355/53 |
| 5,245,552 | 9/1993 | Andersson et al. | 364/508 |
| 5,329,077 | 7/1994 | Skalski et al. | 187/133 |
| 5,386,372 | 1/1995 | Kobayashi et al. | 364/574 |
| 5,409,078 | 4/1995 | Ishioka et al. | 180/300 |
| 5,419,198 | 5/1995 | Pla | 73/660 |

FOREIGN PATENT DOCUMENTS

| | | |
|---|---|---|
| 425352 | 5/1991 | European Pat. Off. . |
| 2257327 | 1/1993 | United Kingdom . |

*Primary Examiner*—Emanuel T. Voeltz
*Assistant Examiner*—Demetra R. Smith
*Attorney, Agent, or Firm*—Larson & Taylor

[57] ABSTRACT

For active damping of vibration at a location subjected to a primary vibration field, a vibratory wave is generated by adaptive filtering of a reference signal and interferes with the primary field at the location. The residual amplitude of vibration at the location is measured, and filtering is adapted automatically to cancel the residual amplitude as measured. The reference signal is divided into a plurality of individual reference signals that are sine-shaped each containing only one of the plurality of frequencies at which the primary field presents a significant energy, with each individual signal being subjected to a respective adaptive digital filter, and the vibratory wave is generated from the sum of the individual filtered signals. An apparatus for implementing the method comprises n processing paths or channels, each having an actuator driving a digital filter, fed with a sine-shaped signal at a frequency corresponding to a concentration of vibratory energy to be damped.

10 Claims, 3 Drawing Sheets

METHOD AND APPARATUS FOR ACTIVE DAMPING OF VIBRATION

BACKGROUND OF THE INVENTION

The invention relates to methods and to apparatuses for active damping of vibration, for reducing and if possible cancelling the vibration of a mechanical member or of a medium.

The term "vibration" should be understood in a general sense and as defining phenomena that are periodic or random in nature and that may have a very wide variety of origins, e.g. vibration of a mechanical member or vibration of a fluid in the form of soundwaves propagating freely or in guided manner, within any frequency range.

A method is already known for active damping of vibration at at least one determined location subjected to a primary vibration field, whereby a vibratory wave is generated by adaptive filtering of a reference signal and for the purpose of interfering with the primary field at said location; the residual amplitude of vibration at said location is measured, and filtering is adapted automatically to tend to cancel the residual amplitude as measured in this way.

An apparatus is also known for active damping of vibration and enabling the above-defined method to be implemented: such apparatus includes at least one actuator capable of responding to adaptive filtering of a reference signal to generate a vibratory wave for interfering with the primary field at said location; at least one sensor providing an electrical signal representative of the residual amplitude of the vibration at said location; and means for adapting the coefficients of the adaptive filter as a function of the residual amplitude signal tending to cancel said residual amplitude.

By way of example, FIG. 1 shows a conventional structure of such an apparatus, intended, at a determined location, to reduce noise of any origin, but in which energy is concentrated at harmonic frequencies. The apparatus generally comprises a sensor 10 such as a microphone placed at the location to be protected, a generator 12 for generating a reference signal x, containing all of the harmonic frequencies at which the noise to be damped presents significant energy, a digital filter 14 receiving the reference signal, and a source 16 of vibratory waves for interfering with the primary noise field, and driven by the filter 14. Under such circumstances, the source 16 is generally consitituted by a loudspeaker that provides "counter-noise".

The filter is generally a digital filter using synchronous sampling and it consequently includes an input analog-to-digital Converter and an output digital-to-analog converter. It is adaptive responsive to an error signal e, having an amplitude and a phase representative of the residual noise picked up by the sensor 10. In general, for reasons of simplicity, adaptation is performed using the gradient algorithm. The coefficients of the filter 14 are continuously adjusted by performing correlation between the error signal e delivered by the sensor 10, and the signal x, obtained by processing the reference signal x in a loop filter 18 having a transfer function that is representative of the physical transfer function between the source 16 end the sensor 10 at each of the harmonic frequencies to be dealt with.

In many cases, the frequencies to be processed are multiples of a fundamental frequency $1/T_o$ of the reference signal. This applies in particular to noise generated by a rotating shaft, where the fundamental frequency has a linear relationship with the rotation of the speed. The harmonic frequencies are then of the form $n/T_o$ where n is any positive integer. In practice, in most cases, it suffices to provide attenuation for a few values only n, corresponding to those frequencies at which the energy in the primary vibratory field to be damped is concentrated.

The speed with which the gradient algorithm converges depends:

on the autocorrelation matrices of the filtered reference signal $x_f$; and on the convergence coefficient (iteration step) selected for the algorithm that adapts the coefficients of the digital filter.

When there is a large number of frequencies $n/T_o$ to be taken into account (i.e. when the number of energy peaks is high), then the autocorrelation matrices are such that convergence can become very slow.

SUMMARY OF THE INVENTION

It is an object of the present invention to provide a method and apparatus that satisfy practical requirements better than the prior art whenever several frequencies need be taken into account in order to damp vibration sufficiently. It is a more specific object to reduce the convergence time under such circumstances.

To do this, there is provided a method of the kind defined above, wherein the reference signal (x) is divided into a plurality of individual reference signals that are sine-shaped $(x_1, \ldots, x_n,)$ each containing only one of the plurality of frequencies at which the primary field presents significant energy, with each individual signal being subjected to a respective adaptive digital filter, and the vibratory wave is generated from the sum of the individual filtered signals.

In other words, discrete frequencies (generally harmonic) are distributed between a plurality of independent processing paths. By using as many individual adaptive filter operations as there are frequencies to be processed, convergence coefficients are available that can be adapted independently, with no more than one coefficient per frequency to be processed. Convergence of the algorithm can consequently be faster. For each path, the convergence coefficient p can be optimized on line by normalizing the inverse of the trace of the autocorrelation matrix of the filtered signals corresponding to the various frequencies $x_{1f}$, $x_{2f} \ldots, x_{nf}$ respectively.

The number of samples required for representing the individual reference signals is much smaller than that required for representing a complex non-filtered reference signal, and as a result each path is much simpler than the path that would be required in an apparatus of the prior art.

In prior art apparatus, the single digital filter generally requires samples synchronous with the reference signal. In an advantageous embodiment of the invention, digital filtering takes place without seeking synchronization, and at a sampling frequency that is selected to further increase the speed with which the algorithms converge.

The invention also provides apparatus suitable for implementing the above method, comprising n processing paths or channels, each having an actuator(s) driving digital filter, fed with a sine-shaped signal at the own frequency of the filter, and corresponding to a concentration of vibratory energy to be damped, the coefficients thereof being adaptable by means of a respective loop, that receives, firstly, an error signal, delivered by at least one sensor placed at a location that is subject to the primary vibratory field to be damped at said location and, secondly, the input signal of the digital filter, as filtered by a loop filter; and the outputs of the different paths or channels are added and applied to at least one actuator, each loop filter having a transfer function representative of the physical actuator(s)-sensor(s) transfer function at the individual frequency under consideration.

The various paths of the apparatus may be constituted by discrete elements specific thereto. However, the filters may also be implemented by programming a computer or by an application specific integrated circuit (ASIC).

The method and the apparatus of the invention may be considered as using a distributed algorithm enabling faster convergence, particularly when the system is complex.

The invention will be better understood from the following description of particular embodiments given as non limiting examples. The description refers to the accompaniing drawings.

DETAILED DESCRIPTION

Various possible structures of apparatuses of the invention will now be described, it will initially be assumed that the vibrations to be processed are periodic in character, on that their energy is concentrated at frequencies that are fixed or that vary slowly over time, then consideration will be given to the case of random frequencies.

APPARATUS FOR DAMPING PERIODIC VIBRATIONS

Figure 1:
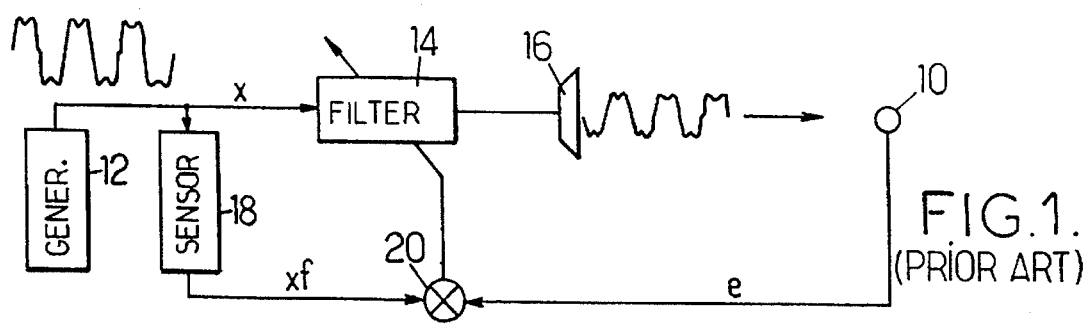
FIG. 1, already mentioned above, is a block diagram of an apparatus of the prior art.
Figure 2:
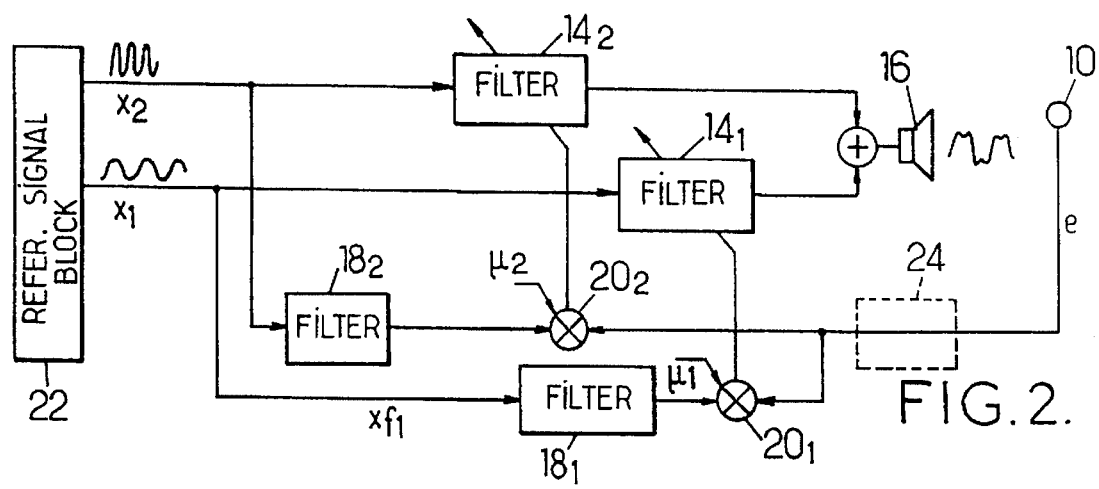
FIG. 2 is a block diagram showing the basic structure of an apparatus constituting a first embodiment of the invention, with two paths only being shown.

The apparatus whose basic structure is shown In FIG. 2, comprises a unit 22 for providing individual reference signals $x_1$ (at frequency $1/T_o$), and $x_2$ (at frequency $2/T_o$), etc . . . to respective processing paths. Each path includes its own digital filter that is adaptive according to the gradient algorithm and that has an appropriate increment step or convergence coefficient. For example, the first path includes a digital filter $14_1$ whose coefficients are adapted from an individual reference signal $x_{f1}$, the error signal e, and the convergence coefficient $\mu_1$. The coefficients of the digital filter are adjusted by a multiplier $20_1$ : the direct product of e multiplied by x constitutes a non-biased estimation of the degree of correlation.

If unit 22 performs synchronous synthesis, it suffices to have two samples per period in each all the filters $14_1$, $14_2$, etc . . . If the fundamental frequency $1/T_o$ is stable or varies only within a limited range, two sampling points are still sufficient, so two coefficients are sufficient in filters $18_1$, $18_2$, etc . . . However, if the period $T_o$ is not stable, then a larger number of points will be required in order to cover the entire range of possible variations.

Instead of providing each multiplier 20, with an analog-to-digital converter, it is of advantage to place a single converter 24, at the output of sensor 10.

An apparatus of the kind shown in FIG. 2 can be used by driving the individual reference signals $x_1$, $x_2$, in unit 22 from a signal coming from a sensor placed in the vicinity of the location to be protected, i.e. a sensor that is responsive to the primary field. For example, if the noise source is a rotating structure, then the sensor can be designed to provide a square-wave signal at a frequency that is proportional to the speed of rotation. Such a sensor may, for instance, comprise a toothed ring carried by the rotating structure, having teeth that move past a magnetic sensor. The unit 22 may then be constituted by a waveform synthesizer.

Figure 3:
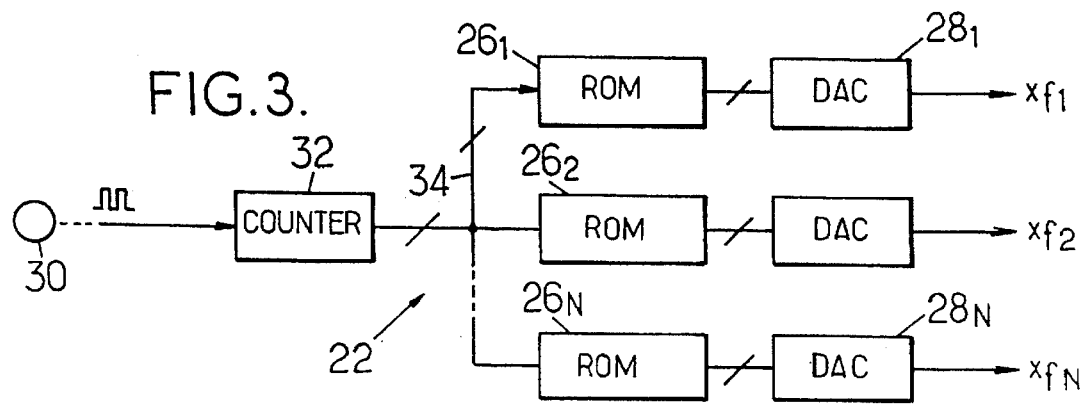
FIGS. 3 and 4 are block diagrams of possible ways of generating the reference signals used in the apparatus of FIG. 2.

Refering to FIG. 3, there is shown an embodiment of such a synthesizer suitable for use when the sensor provides, for each fundamental period $T_o$, a number of pulses that is greater than twice the highest harmonic order to be processed i.e. at least 2N pulses per fundamental period $T_o$ if the highest order is N. For each path, it comprises a memory $26_1$, $26_2$, . . . , $26_n$ containing the digital samples of the sine-shaped signals to be generated. The data bus of the memory is connected to a digital-to-analog converter, e.g. $28_1$, which generates the analog signal to be applied to the corresponding filter, e.g. $14_1$. The successive pulses from sensor 30 placed in the vicinity of the location to be protected increment a counter 32 whose output is applied to the address bus 34 of all memories $26_1$, . . . , $26_n$ at once. The memories provide the reference signals at their output for each of the harmonics 1, 2, . . . N.

In a modified embodiment (not shown), the data bus of the memory is connected directly to the respective filters, e.g. $14_1$ and $18_1$. Under such circumstances, the frequency at which the reference signal is up-to-dated, must be high (at least ten times greater than the signal acquisition frequency used for implementing the algorithm) in order to avoid aliasing.

It is not always possible to obtain a reference signal at a very high frequency from a sensor responsive to the vibrations to be attenuated, e.g. because the sensor can only provide a small number of pulses per fundamental period.

Figure 4:
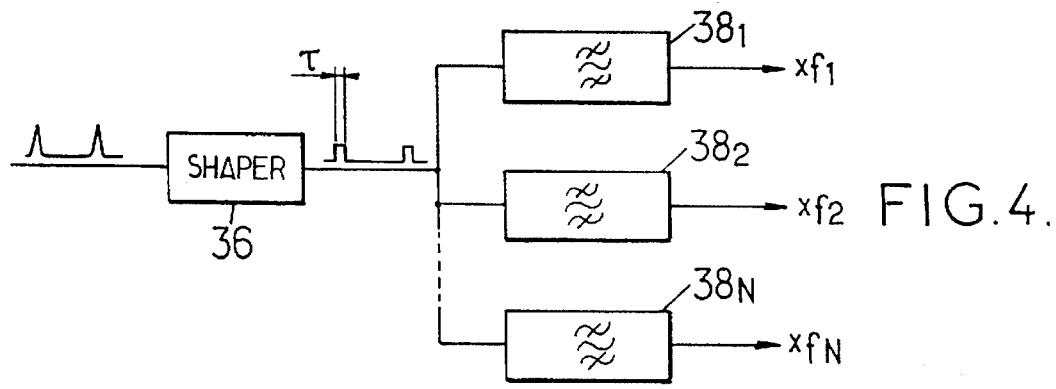

If the sensor provides only a small number of pulses per revolution (i.e. a small number of pulses per fundamental period), a first solution consists in locating a frequency multiplier downstream of Another solution consists in replacing the apparatus shown in FIG. 3 by that shown in FIG. 4, which corresponds to the case where the available synchronization signal is constituted by one pulse per fundamental period $T_o$.

The pulses provided by the sensor are transformed by a shaping circuit 36 into square-wave pulses that are repeated at the fundamental frequency $1/T_o$, each pulse having the same duration $\tau$, selected in such a manner that the signal has sufficient energy for each of the harmonics to be processed. The resulting signal is applied to serie of path each constituted by a pass-band filter $38_1$, $38_2$, . . . , $38_n$ having a very narrow pass-band, so that each filter isolates the harmonic which is to be taken into account by the corresponding digital filter. In particular, it is possible to use high order active pass-band filters or heterodyne type filters.

The signal having a single pulse per fundamental period may be obtained from a very wide range of sources.

When damping vibrations in a structure where noise generated by a rotating structure (machine shaft, fan wheel, propeller shaft, turbo-jet shaft, car camshaft, etc . . . ), it may come from a sensor, e.g. an optical sensor or a magnetoresistive sensor, that cooperates with an index carried by the rotating structure.

In other cases, the fundamental period of the vibration is not tied to a directly measurable physical magnitude, but is present in an observable signal. This situation is met, for example, when the method is used to attenuate the noise emetted by a mechanism that presents mechanical vibration that is directly measurable by means of a detector which supplies a complex signal which contains, in particular, the fundamental period. Under such circumstances, a synchronization signal having a pulse of duration $\tau$ per fundamental period may be obtained by subjecting the physical signal $\tau$ delivered by the detector firstly to low pass filtering with a cut off frequency that removes all harmonics of order greater than 1, together with possible interfering frequencies, followed by processing in circuits implementing saturating, clamping, and shaping.

Figure 5:
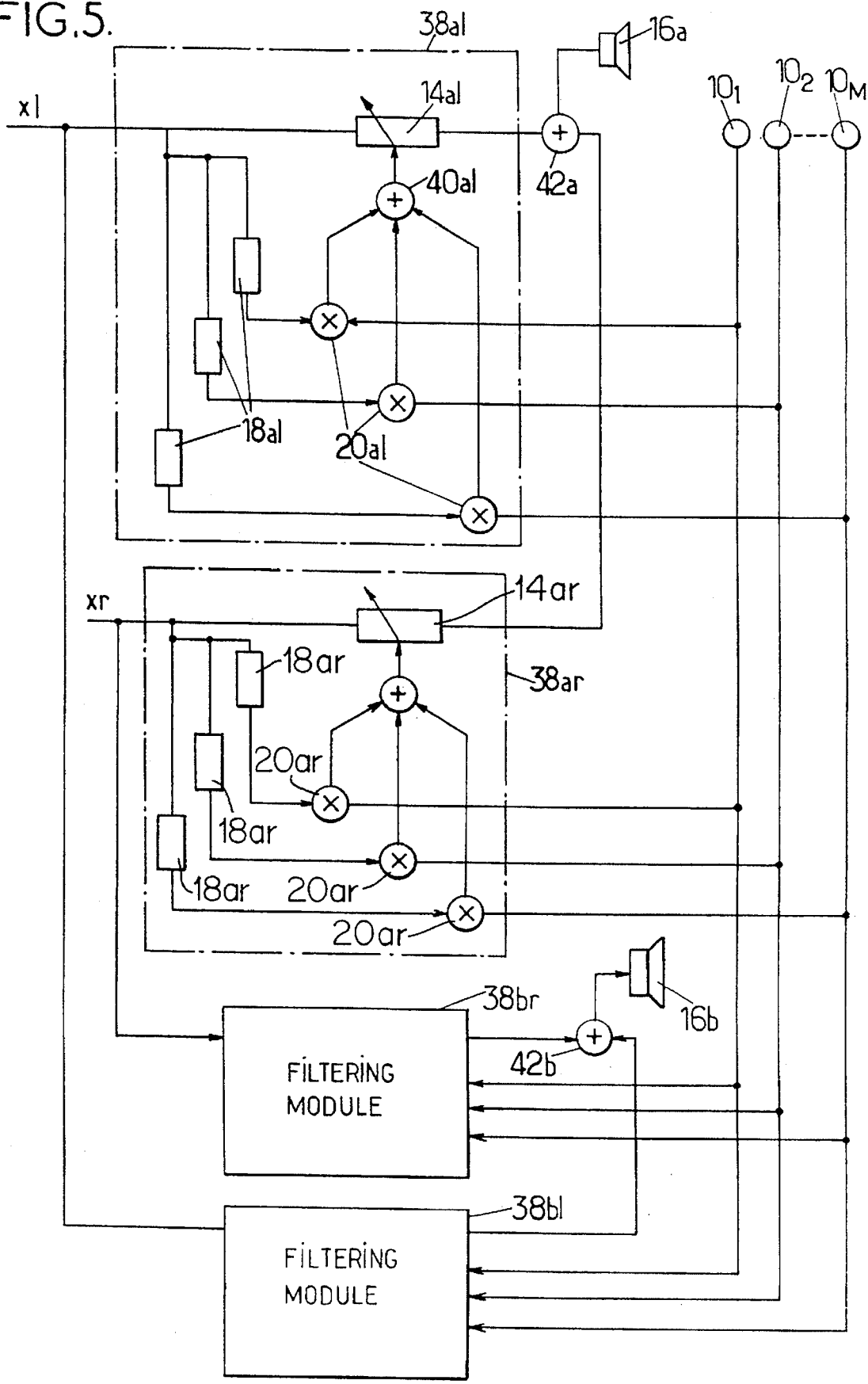
FIG. 5 similar to FIG. 2, is a block diagram of damping apparatus using a plurality of sensors and a plurality of damping actuators.

The apparatus whose basic structure is shown in FIG. 2 may be generalized to the case of an installation having a plurality of sensors placed at different locations where vibration is to be attenuated simultaneously, and having a plurality of actuators. Such an apparatus may be used for attenuating noise at a plurality of locations or for damping mechanical vibrations at a plurality of positions, and it may perform the same functions as those described in document EP-A-0 425 352. By way of additional example, FIG. 5 shows an apparatus for damping sound vibrations in two frequency ranges corresponding to two reference frequencies $x_1$ and $x_r$, on the basis of signals provided by M sensors $10_1, \ldots, 10_M$; the apparatus has two actuators $16_a$ and $16_b$, such as soures of counter-noise. In this case, each of the filters 14 of FIG. 2 is replaced by a plurality of modules (the modules being in same number of modules as the actuators) i.e. by two modules, having references a and b allocated respectively thereto when there are two actuators. The apparatus of FIG. 5 consequently comprises four modules : $38_{a1}$, $38_{ar}$, $38_{b1}$, and $38_{br}$, with only the first two thereof being showed in full. For example, the module $38_{a1}$ again includes a digital filter $14_{a1}$ whose coefficients are adjusted by means of a loop. However, the loop has M branches, each corresponding to one of the sensors $10_1, 10_2, \ldots, 10_M$. The outputs of multipliers $20_{a1}$ in the three branches are summed by an adder $40_{a1}$ and the result is applied to the filter $14_{a1}$. Finally, the actuator $16_a$ receives the sum of the output signals from the modules $38_{a1}$ and $38_{ar}$, as performed by an adder $42_a$. The digital filters are generally purely transverse filters.

Similarly, the actuator $16_b$ receives the output from an adder $42_b$ connected to the outputs of modules $38_{b1}$, $38_{br}$.

It could be seen that the circuits are ,disposed parallel (which term must be construed as extending to the case of software implementation) for the various actuators or sources of conter-vibration $16_a$, $16_b$, etc . . . The output signals from the sensors are communicated to each of the calculation modules.

Figure 6:
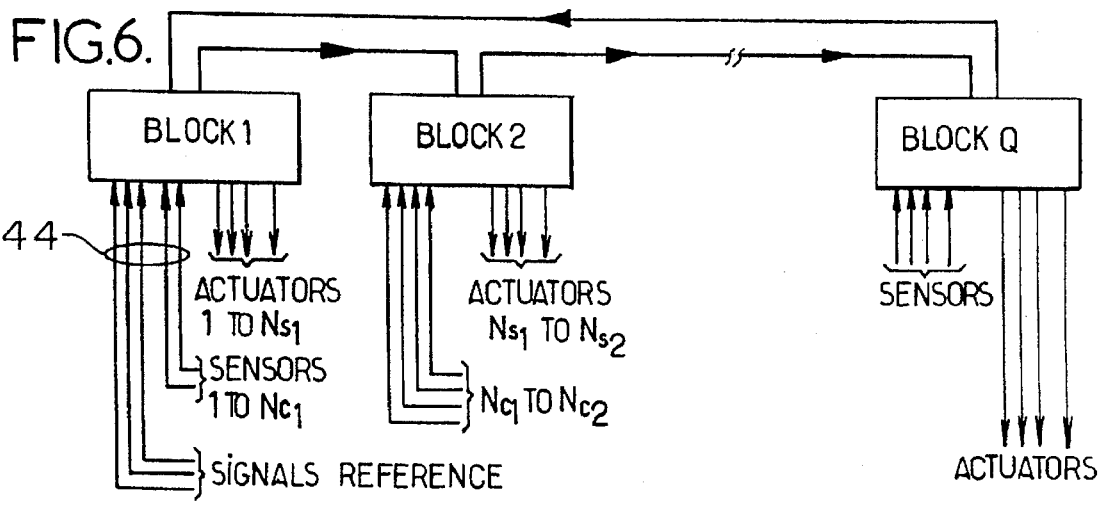
FIG. 6 is a diagram showing one possible way of distributing the functions of the apparatus of FIG. 5.

A possible hardware architecture for the block diagram of FIG. 5 is given in FIG. 6. The basic structure shown in FIG. 6 is comparable to that of FIG. 5, i.e. it includes identical modules placed in parallel. However, functions are distributed slightly differently, so as to optimize the number of calculation blocks and so as to make the best possible use of the calculation resources in each block. To do this, each block is designed to feed a plurality of actuators or sources of counter-vibrations and, for each actuator under its control, it receives all of the reference signals that need to be taken into account.

Each of the blocks 1 to Q shown in FIG. 6 takes charge of the corresponding analog outputs leading to the actuators under its control, e.g. 1 to $Ns_1$ for the block 1, $Ns_1$ to $Ns_2$ for the block 2 . . . ; the block Q processes the last actuators. The analog inputs from the sensors are distributed between the blocks, e.g. 1 to $Nc_1$ for block 1, $Nc_1$ to $Nc_2$ for block 2, etc . . .

All of the input data (reference signals and sensor signals) may be communicated to the set of computation blocks by a digital link 44. The analog reference signals are applied solely to block 1, from which they are distributed to the other blocks.

The blocks may be interfaced to one another by means of series or parallel links. Which kind of link is used will depend on whether it is more important to reduce the number of connections or to increase the speed of computation. When the apparatus is implemented on an existing processor, the link will be chosen in such a manner as to make maximum use of the links originally provided in the processor, within each block, so as to avoid excessively complicating memory mapping.

In addition to the links shown in FIG. 6, the apparatus also includes control conductors (mostly not shown) enabling interrupt to be performed, serving to distribute a clock signal, and successively causing the various operating stages to be performed (preliminary stage of identifying the characteristics of the system, followed by a control stage in which active damping takes place).

Data may be interchanged between blocks as data frames emitted by each block in turn toward all of the other blocks. A frame includes the samples of the analog paths (output signals of the sensors) associated with the block also delivers service data, e.g. identifying the paths whose data is being transmitted, identifying the emitting block, and indicating it is in operating order.

The filtering and adaptation algorithms may be performed either in parallel or subsequent to an interchange of data, depending on whether or not the processor uses a facility for transparent management of a direct memory access mode.

Figure 7:
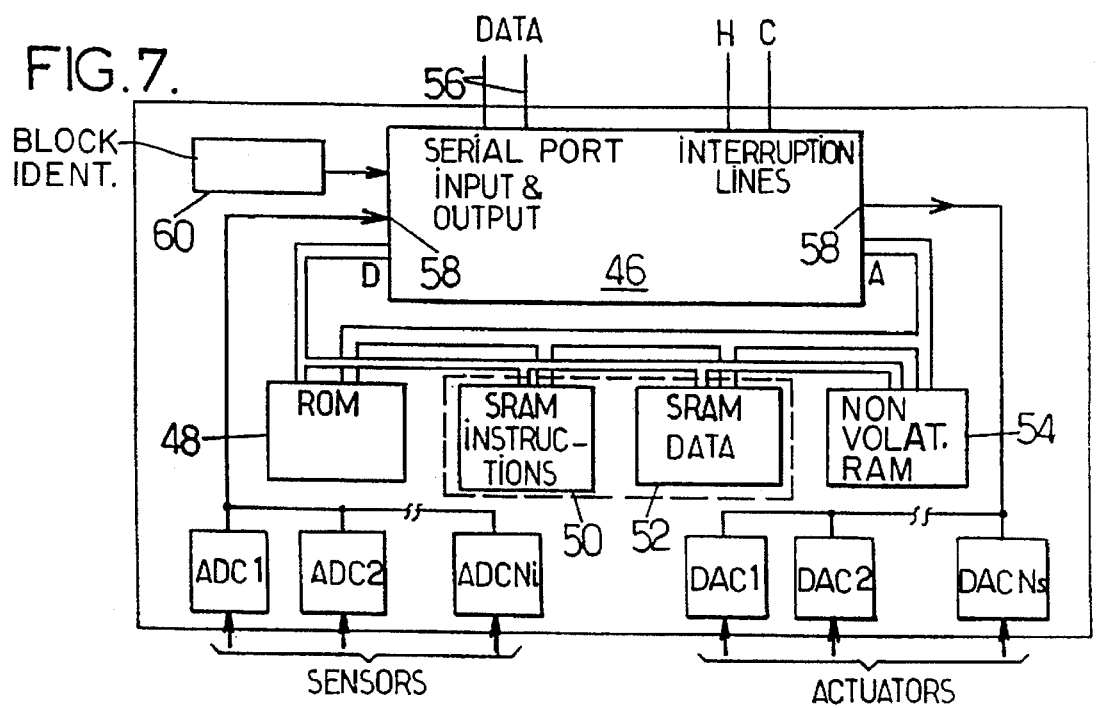
FIG. 7 shows one possible structure of one of the blocks in FIG. 6.

The clock (not shown) sets the rate at which tasks are executed, the rate at which the analog inputs paths are acquired, and the rate of delivery of analog outputs. The necessary digital-to-analog and analog-to-digital converters are not shown in the figures in order to simplify them. Each of the functional blocks shown in FIG. 6 may have the structure shown in FIG. 7. The block has input converters, $ADC_1, \ldots, ADC_{Ne}$, and digital-to-analog output converters $DAC_1, \ldots, DAC_{Ne}$, e.g. of the sigma delta type enabling to dispense with input anti-aliasing filters and also enabling output reconstruction filters to be avoided. Only the first block is connected to the clock H of the system. The processor 46 receives the input signals coming from the sensors and provides signals for actuating the actuators associated therewith. It is connected to a read only memory 48 which contains the application software, that is suitable for remote loading into fast memories for instructions and data 50 and 52 (e.g. SRAMs) when the system is initialized. The non-volatile memory 54 is advantageously designed to store parameters of the system as identified on site, together with the context and the essential parameters of the control algorithm in the event of a short loss of electrical power.

The processor 46 has serial accesses 56 for communicating with other blocks and 58 for connection the converters. A block identification circuit 60 provides a block additification word to the processor 46 over a parallel access, which word may be transferred to the other blocks to provide an indication of the origin of signals.

With digital filters that have a Sampling frequency that is asynchronous relative to the reference signal, the apparatuses shown in FIG. 2 and 5 are usable when the vibratory phenomenon (noise or mechanical vibrations of a structure) to be damped includes a plurality of peaks at frequencies that do not have a common dividing factor other than 1.

The fixed transfer function of each of the loop filters may be determined on line once and for all during a preliminary stage, e.g. using a standard noise source enabling actuator (s)-sensor(s) transfer function to be determined. On this topic, reference may be made to the proper "Theoretical and experimental study of the convergence of MIMO CMS algorithms for use in active control of periodic noise" by G. Billcud et al in "Rencontres Scientifiques du Cinquantenaire du LMA", Publications of the LMA no. 127, ISSN 0750–0756, pages 31 to 47.

Apparatus for damping periodic vibrations having a fundamental frequency that varies rapidly within a determined range In some cases, the fundamental frequency of the vibration and thus the harmonic frequencies may change rapidly.

The apparatus described above is still applicable, providing the transfer functions of the loop filters processing the reference signals are representative of the physical transfer functions of the actuator-sensor system over the entire frequency range aroud the set frequency, $n/T_o$ for the path allocated to the nth harmonic. The problem is then much easier to solve than in the prior art because each filter is required to possess only-one set frequency.

As an example of a situation where these circumstances may arise, mention may be made of motor vehicles where the power peaks in the noise change rapidly in frequency while the vehicle is moving.

Apparatus for damping vibrations at random frequencies

The apparatuses described above are also applicable to vibratory phenomena where power peaks are at frequencies which very randomly over a wide range. Under such circumstances, the various frequency paths of the apparatus are designed so that the reference signals applied to various paths correspond to bands that are different, but adjacent; such that they are considered as a whole, the reference signals completely cover the frequency range in which the vibration to be damped can arise.

The band width allocated to each path is selected in such a matter that the actuator-sensor transfer function is relatively uniform for all the frequencies in the band and can be represented by a single transfer function.

Because of the random nature of the frequencies at which the energy to be damped is concentrated, the reference signals allocated to each path must be coherent with the signals provided by the physical sensors that deliver the signal representative of the original or residual vibration. This condition is necessary because the damping implements a linear algorithm.

This condition can be satisfied by generating reference signals according to a linear process (which guarantees coherence) of the signal delivered by a sensor or of a plurality of signals from physical sensors measuring a parameter that is coherent with the vibrations to be damped.

For apparatus having a single sensor, and providing it provides an output signal having sufficient harmonic content, the various reference signals may be generated by a set of pass-band filters of structure comparable that of filters $28_1, \ldots, 28_n$ of FIG. 3. However the pass-band filters must then have pass-bands that are mutually contiguous.

Figure 8:
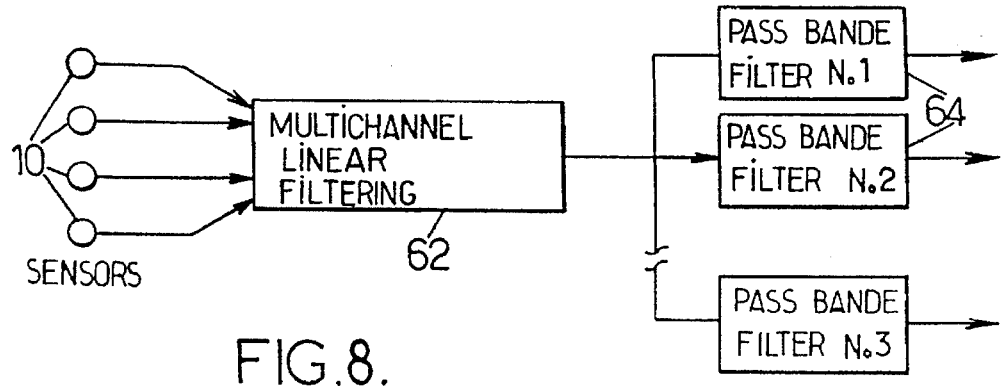
FIG. 8 is similar to FIG. 3 and shows one possible way of generating reference signals for vibrations at frequencies that vary ramdomly.

For an apparatus having a plurality of sensors (FIG. 8), the output signals from all of the sensors may be applied to a multichannel linear filter 62, which delivers a complex signal containing all of the frequencies provided by the various sensors to the pass-band filters 64. The multichannel falter 62 performs a linear combination of the input signals coming from the sensors 10, and it may apply weighting that can be determined experimentally so as to achieve balance between the various different contributions.

I claim:

1. A method for active damping of vibration at at least one predetermined location subjected to a primary vibration field, comprising the steps of:

generating a reference signal;

splitting said reference signal into a plurality of substantially sine-shaped individual reference signals each at one among a plurality of mutually harmonic frequencies at which said primary vibration field has a peak of energy;

generating a plurality of individual vibratory waves each by digital adaptive filtering of one of said individual reference signals;

measuring a residual value of vibrations at said predetermined location;

generating a composite vibratory wave from a sum of said individual vibratory waves, and causing said composite vibratory wave to interfere with said primary field at said predetermined location; and automatically adapting each said digital adaptive filtering for cancelling said residual value for a respective one of said mutually harmonic frequencies.

2. Method according to claim 1, wherein said adaptive digital filtering is linear and the convergence coefficients of the different filtering processes are independently selected.

3. Method according to claim 2, comprising the steps of selecting a value of each convergence coefficient which is in reverse relation with the trace of an autocorrelation matrix of the individual filtered signal corresponding to the respective frequency peak.

4. Method according to claim 1, wherein said digital filtering is carried out without attempt for synchronism between samples subjected to filtering and the respective individual reference signal.

5. An apparatus for active vibration damping at at least a predetermined location subjected to a primary vibration field consisting of periodical vibrations, comprising:

at least one sensor located at said location;

at least one actuator for generating a vibratory wave for interfering with said primary field at said location;

a plurality n of processing paths, wherein n is an integer greater than 1, each having; a digital filter for driving said at least one actuator; means for delivering, to said digital filter, a sine-shaped reference signal at a respective individual frequency at which there is a concentration of vibratory energy to be damped; and an adaptation loop for adapting said digital filter, said loop receiving said sine-shaped signal through a loop filter having a transfer function representative of a physical actuator-sensor transfer function at the respective individual frequency and an error signal delivered by said at least one sensor; and summing means connected to receive outputs of said processing paths and applying the summed outputs to said at least one actuator, wherein said sine-shaped signal applied to each path is delivered by a unit comprising at least one detector located in the vicinity of said location and delivering a signal consisting of pulses at a frequency at least twice the highest frequency to be damped.

6. Apparatus according to claim 5 further comprising a synthesizer having, for each path, a digital memory containing samples of the sine-shape signals to be generated, and a counter for addressing said digital memories.

7. Apparatus according to claim 5, wherein said means for delivering a sine-shaped signal comprises reference sensor means common to all said paths and constructed to deliver square-wave pulses repeated at a fundamental frequency $1/T_o$, each pulse having a same duration such that the signal has sufficient energy for each of the frequencies to be damped and comprises a plurality of pass-band filters connected to receive said pulses and each having a narrow pass-band for isolating a respective frequency.

8. Apparatus according to claim 5, having a plurality of said sensors at a plurality of different locations and a plurality of said actuators, wherein each said digital filter has a plurality of modules equal in number to said actuators, each having its own said adaptation loop, all loops of a same one of said modules receiving a same said sine-shaped signal.

9. An apparatus for active vibration damping at at least a predetermined location subjected to a primary field of vibrations which are periodical at a fundamental frequency $1/T_o$ which may exhibit fast variations in time, within a predetermined limited range, comprising:

at least one sensor located at said location;

at least one actuator for generating a vibratory wave for interfering with said primary field at said location;

a plurality n of processing paths, n being an integer greater than 1, each having: a digital filter for driving said at least one actuator; means for delivering, to said digital filter, a sine-shaped reference signal at a respective individual frequency at which there is a concentration of vibratory energy to be damped; and an adaptation loop for adapting said digital filter, said loop receiving said sine-shaped signal through a loop filter having a transfer function representative of a physical actuator-sensor transfer function at the respective individual frequency and an error signal delivered by said at least one sensor; and summing means for receiving and summing outputs of said processing paths and applying the summed outputs to said at least one actuator, each of said loop filters having a transfer function representative of a physical actuator-sensor transfer function, within the whole of said range, about a respective individual frequency which is $n/T_o$ for that of said processing paths which is dedicated to the nth harmonic of the period $T_o$.

10. An apparatus for damping vibrations at at least a predetermined location subjected to a primary vibration field at randomly varying frequencies, comprising:

at least one sensor located at said location;

at least one actuator for generating a vibratory wave for interfering with said primary field at said location;

a plurality n of processing paths, n being an integer greater than 1, each having: a digital filter for driving said at least one actuator; means for delivering, to said digital filter, a sine-shaped reference signal at a respective individual frequency at which there is a concentration of vibratory energy to be damped; and an adaptation loop for adapting said digital filter, said loop receiving said sine-shaped signal through a loop filter having a transfer function representative of a physical actuator-sensor transfer function at the respective individual frequency and an error signal delivered by said at least one sensor; and summing means connected for receiving and summing of said processing paths and applying the summed outputs to said at least one actuator;

the different paths being arranged for the reference sine-shaped signal applied to different said paths to correspond to mutually adjacent frequency bands so selected that, considered as a whole, the sine-shaped reference signals completely cover the frequency field in which vibrations to be damped may occur, each path being dedicated to a band width which is selected for the respective actuator-sensor transfer function to be relatively constant for all frequencies in the band and to be represented by only one transfer function.

\* \* \* \* \*